(12) United States Patent
Moulios

(10) Patent No.: US 7,254,455 B2
(45) Date of Patent: Aug. 7, 2007

(54) SYSTEM FOR AND METHOD OF DETERMINING THE PERIOD OF RECURRING EVENTS WITHIN A RECORDED SIGNAL

(75) Inventor: Christopher J. Moulios, Madison, WI (US)

(73) Assignee: Sony Creative Software Inc., Madison, WI (US)

( * ) Notice: Subject to any disclaimer, the term of this patent is extended or adjusted under 35 U.S.C. 154(b) by 721 days.

(21) Appl. No.: 09/835,253

(22) Filed: Apr. 13, 2001

(65) Prior Publication Data

US 2003/0014135 A1  Jan. 16, 2003

(51) Int. Cl.
 *G06F 17/00* (2006.01)
 *G09B 15/00* (2006.01)
(52) U.S. Cl. .................... 700/94; 84/484; 715/716
(58) Field of Classification Search ............. 700/94; 84/484; 715/716
See application file for complete search history.

(56) References Cited

U.S. PATENT DOCUMENTS

| 5,265,248 | A  |   | 11/1993 | Moulios et al. ............ 395/650 |
| 5,734,731 | A  | * | 3/1998  | Marx .......................... 381/119 |
| 6,175,632 | B1 | * | 1/2001  | Marx .......................... 381/56  |
| 6,225,546 | B1 | * | 5/2001  | Kraft et al. .................. 84/609  |
| 6,518,492 | B2 | * | 2/2003  | Herberger et al. ............ 84/636  |

* cited by examiner

*Primary Examiner*—Sinh Tran
*Assistant Examiner*—Daniel R. Sellers
(74) *Attorney, Agent, or Firm*—Samuel S. Lee; Procopio, Cory, Hargreaves & Savitch LLP

(57) ABSTRACT

The disclosure relates to a method of determining one or more periods of recurring events within a recorded signal, such as, music. This method can include establishing one or more anchor points in the recorded signal where an anchor point is indicative of a beginning point for a period of recurring events in the recorded signal, determining a length for the period of recurring events in the recorded signal where the length starts from the established anchor point and defines a first loop, and refining the length for the period of recurring events by comparing the first loop with subsequent loops. The subsequent loops have the length of the first loop.

18 Claims, 17 Drawing Sheets

SYSTEM FOR AND METHOD OF DETERMINING THE PERIOD OF RECURRING EVENTS WITHIN A RECORDED SIGNAL

FIELD OF THE INVENTION

The present specification relates generally to computerized signal processing methods and systems. More particularly, the present specification relates to a system for and a method of determining the period of recurring events within a recorded signal.

BACKGROUND OF THE INVENTION

A wide variety of computer systems have been used to create, edit, deliver, and store recorded signals, such as, music. Such computer systems generally include commercially-available computer program products which allow people to create music from multiple recorded signals, edit the music in a variety of ways including combining and changing multiple recorded signals, and store the music in some medium that allows the user to deliver the music in some fashion. Examples of such computer program products include ACID, VEGAS, and SIREN software programs developed and sold by Sonic Foundry, Inc., of Madison, Wis. These exemplary programs are described and can be purchased on the Internet at http://www.sonicfoundry.com.

Such computer-readable recorded signals can be stored in a variety of different computer storage formats. While a computer is inherently a digital machine, recorded signals can be stored in a digital form or an analog form, depending on the application and selected file format. A variety of computer file formats can be used to store recorded signals. Example file formats include the Moving Picture Experts Group Layer-3 Audio (MP3) audio file format, MICROSOFT wave (WAV) audio file format, and Windows Media Audio (WMA) audio file format.

Heretofore, much popular music is produced using computers and other electronic devices. Therefore, such music can include rhythms which repeat at very precise intervals. Disc jockeys, for example, count on the precision of such rhythms to synchronize playback and create new mixes of music. Computer systems can be particularly helpful in the synchronization of such music because of the capacity of computers to combine and process audio signals, maintain large libraries of songs, and store such creations for later delivery.

One of the challenges in creating music collages on computer systems is that music is recorded in a wide range of different tempos. Understandably, music that is recorded at one tempo does not sound good when mixed with music recorded at another. Thus, knowing the tempo and downbeat is important in the creation and editing of music. Nevertheless, music recordings on compact discs (CD), tapes, or other media, generally do not include information on tempo in the recorded signal. It is, therefore, difficult (if not impossible) to properly mix musical media with other musical recordings without having tempo information.

Thus, there is a need for a system for and a method of determining the period of recurring events within a recorded signal. Further, there is a need to precisely identify tempo of a recorded signal so that multiple recorded signals can be successfully mixed together. Even further, there is a need to synchronize musical loops and other musical media to any song and to other time based events such as video, animation, lights, or other timing critical devices.

The teachings hereinbelow extend to those embodiments which fall within the scope of the appended claims, regardless of whether they accomplish one or more of the above-mentioned needs.

SUMMARY OF THE INVENTION

An exemplary embodiment relates to a method of determining one or more periods of recurring events within a recorded signal. This method can include establishing one or more anchor points in the recorded signal where an anchor point is indicative of a beginning point for a period of recurring events in the recorded signal, determining a length for the period of recurring events in the recorded signal where the length starts from the established anchor point and defines a first loop, and refining the length for the period of recurring events by events in the recorded signal, determining a length for the period of recurring events in the recorded signal where the length starts from the established anchor point and defines a first loop, and refining the length for the period of recurring events by comparing the first loop with subsequent loops. The subsequent loops have the length of the first loop.

Another exemplary embodiment relates to a system of providing a measurement of a tempo of a recorded signal in a computer program product. The tempo is a period of recurring events within the recorded signal. The system can include means for establishing one or more anchor points in the recorded signal, means for determining a length for the period of recurring events or a first loop in the recorded signal, and means for refining the length for the period of recurring events by comparing a first loop with subsequent loops. The anchor point is indicative of a beginning point for a period of recurring events in the recorded signal. The length starts from the established anchor point and defines the first loop. Subsequent loops have the same length of the first loop.

Another exemplary embodiment relates to a processing system including a central processing unit (CPU) and a storage device coupled to a processor and having stored there information for configuring the CPU. The CPU can be configured to establish a loop starting point in a recorded signal indicating a beginning point for a period of recurring events in the recorded signal or a loop, determine a length for the loop in the recorded signal where the length starts from the established loop starting point, and adjust the length for the loop by comparing the loop with subsequent loops. Subsequent loops are portions of the recorded signal having the length of the loop and starting at a point in the recorded signal later in time.

Other features and advantages of embodiments of the present invention will become apparent to those skilled in the art upon review of the following drawings, the detailed description, and the appended claims.

BRIEF DESCRIPTION OF THE DRAWINGS

The invention is illustrated by way of example and not limitation using the figures of the accompanying drawings, in which like references indicate similar elements and in which.

DETAILED DESCRIPTION OF THE EXEMPLARY EMBODIMENTS

A system for and method of determining the period of recurring events within a recorded signal are described. In the following description, for purposes of explanation, numerous specific details are set forth to provide a thorough understanding of exemplary embodiments of the invention. It will be evident, however, to one skilled in the art that the invention may be practiced without these specific details. In other instances, well-known structures and devices are shown in block diagram form to facilitate description of the exemplary embodiments.

In one embodiment, a computer system is used which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hardwired circuitry may be used in place of, or in combination with, software instructions to implement the functions described. Thus, the embodiments described herein are not limited to any specific combination of hardware circuitry and software, nor to any particular source for the instructions executed by the computer system.

Figure 1:
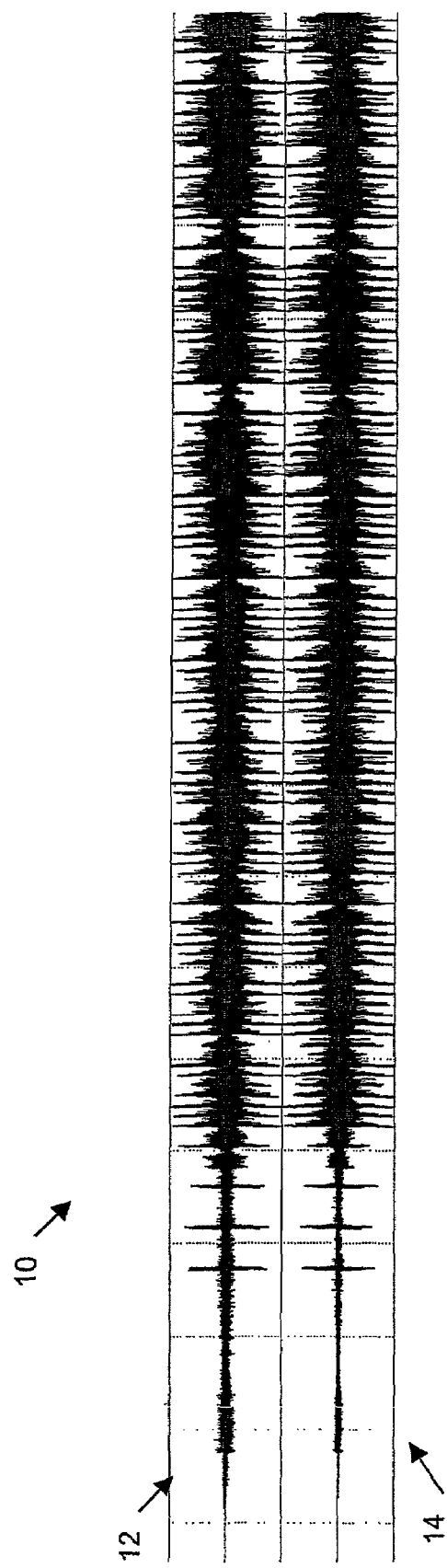
FIG. 1 is a graphical representation of a recorded two channel audio signal depicted as an amplitude versus time.

FIG. 1 illustrates a recorded two channel audio signal 10 as an amplitude over time. In an exemplary embodiment, audio signal 10 is recorded music. Audio signal 10 can be stored electronically in any of a variety of data formats, such as, the Moving Picture Experts Group Layer-3 Audio (MP3) audio file format, MICROSOFT wave (WAV) audio file format, Windows Media Audio (WMA) audio file format, or any format which is readable by a computing device, such as, a personal computer (PC) or a hand held personal digital assistant (PDA). In alternative embodiments, audio signal 10 can be associated with other media, such as, video. As depicted in FIG. 1, audio signal 10 can include channel signals 12 and 14. Channel signals 12 and 14 are used in the stereo reproduction of audio signal 10.

In an exemplary embodiment, audio signal 10 can be produced using a rhythm machine such that the beat is very precise. Audio signal 10 can also be produced by recording live musical performances. In an exemplary embodiment, audio signal 10 is recorded on a compact disc (CD), tape, or vinyl record containing popular music, dance music, or any other genre of music. In an exemplary embodiment, audio signal 10 is displayed or presented on a graphical user interface on a computer screen as described with reference to FIGS. 8-17.

Figure 2:
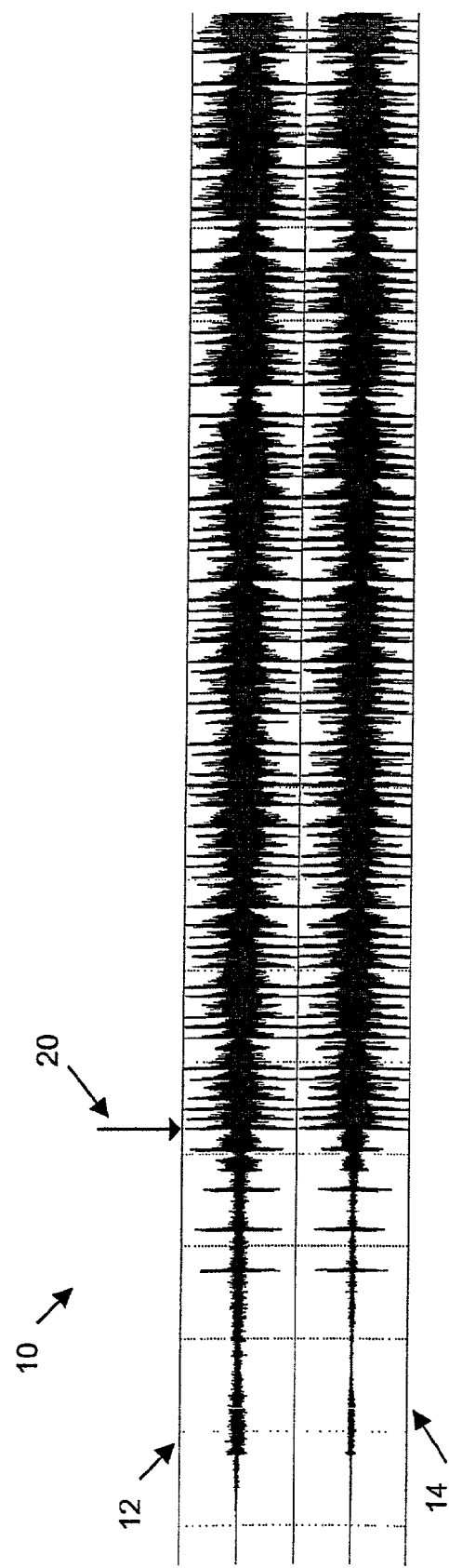
FIG. 2 is a graphical representation of an anchor point in the recorded two channel audio signal of FIG. 1 determined in accordance with an exemplary embodiment.

FIG. 2 illustrates an anchor point 20 in audio signal 10. In an exemplary embodiment, anchor point 20 is an identified location in audio signal 10 where a pattern of recurring events appears to begin. Such an identified location can be identified by the timing of audio signal 10, with the beginning of audio signal 10 being at time t=0. Anchor point 20 provides a reference from which periods of recurring events in audio signal 10 may be determined.

In an exemplary embodiment, anchor point 20 is identified using digital signal processing techniques. In one such digital signal processing technique, a computer program is used to identify a point in audio signal 10 where recurring events may be beginning. Evidence of the beginning point of recurring events can include a point which is soon thereafter repeated. A wide variety of digital signal processing techniques may be employed to make such a determination in an accurate and efficient manner.

Alternatively, anchor point 20 can be identified using human interaction. For example, a person can visually inspect audio signal 10 and ascertain at which point a pattern appears to begin. At such a pattern beginning point, the person can indicate anchor point 20 using a computer input device, such as, a computer mouse, touch pad, or any mechanism which can provide an indication of tempo changes. In an exemplary embodiment, the person can select the anchor point by clicking a mouse cursor over the desired location on the graphical representation of audio signal 10.

Figure 3:
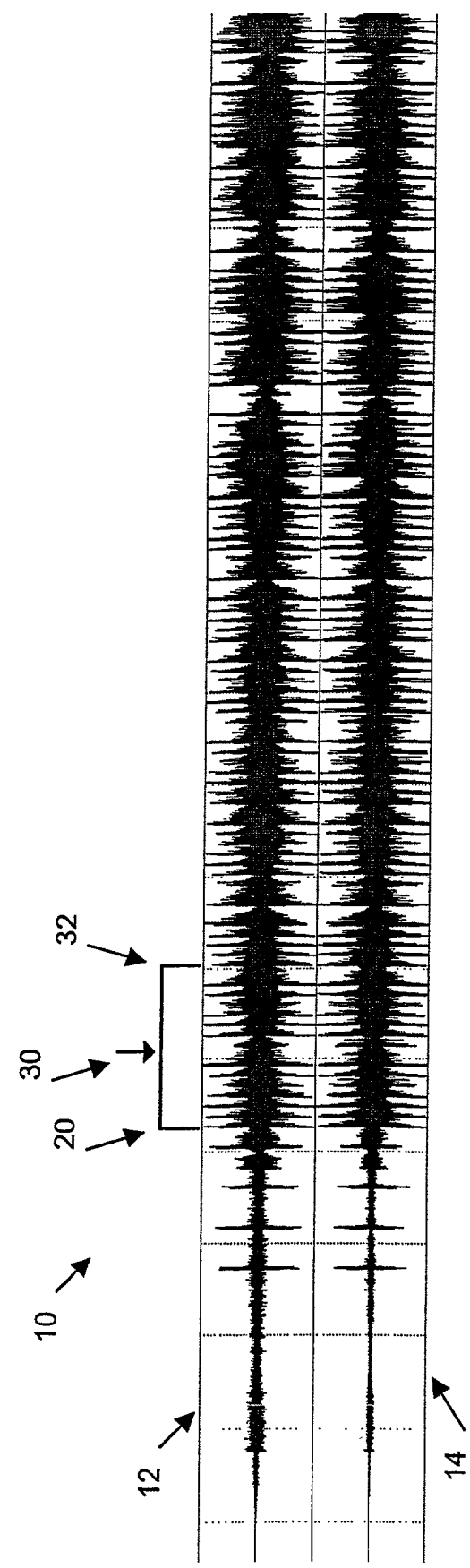
FIG. 3 is a graphical representation of a period in the recorded two channel audio signal of FIG. 2 determined in accordance with an exemplary embodiment.

FIG. 3 illustrates a period 30 in audio signal 10. In an exemplary embodiment, period 30 is an identified location over a certain duration in audio signal 10 where a pattern of recurring events appears to begin. Such an identified location can be identified by time of audio signal 10, with the beginning of period 30 being at time t=t1 and the end of period 30 being at time t=t2. Period 30 is an approximation of a single period of recurring events in audio signal 10. If the beginning time of period 30 is t1 and the ending time of period 30 is t2, then the duration of period 30 is t2–t1.

In an exemplary embodiment, period 30 is identified using digital signal processing techniques. In one such digital signal processing technique, a computer program is used to identify the duration of recurring events in audio signal 10 before the recurring events repeat. Evidence of the duration of recurring events can include a digital comparison of audio signal 10 starting from anchor point 20 with portions of audio signal 10 subsequent to anchor point 20. A wide variety of digital signal processing techniques may be employed to make such a determination in an accurate and efficient manner. In another embodiment, a computer program makes an analog comparison of audio signal 10 starting from anchor point 20 with portions of audio signal 10 subsequent to anchor point 20. A wide variety of analog signal processing techniques may be employed to make such a determination in an accurate and efficient manner.

Alternatively, period 30 can be identified using human interaction. For example, a person can visually inspect audio signal 10 and ascertain at which point a pattern appears to repeat. At such a pattern repeating point, the person can indicate a repeating point 32 using a computer input device, such as, a computer mouse, touch pad, or any mechanism which can provide an indication of tempo changes. In an exemplary embodiment, the person can select the repeating point by clicking the computer cursor over the desired location on the graphical representation of audio signal 10. In another exemplary embodiment, the person can identify a tempo by physical means, such as, tapping instead of by visual means. Accordingly, period 30 would be the portion of audio signal 10 ranging from anchor point 20 to repeating point 32.

Figure 4:
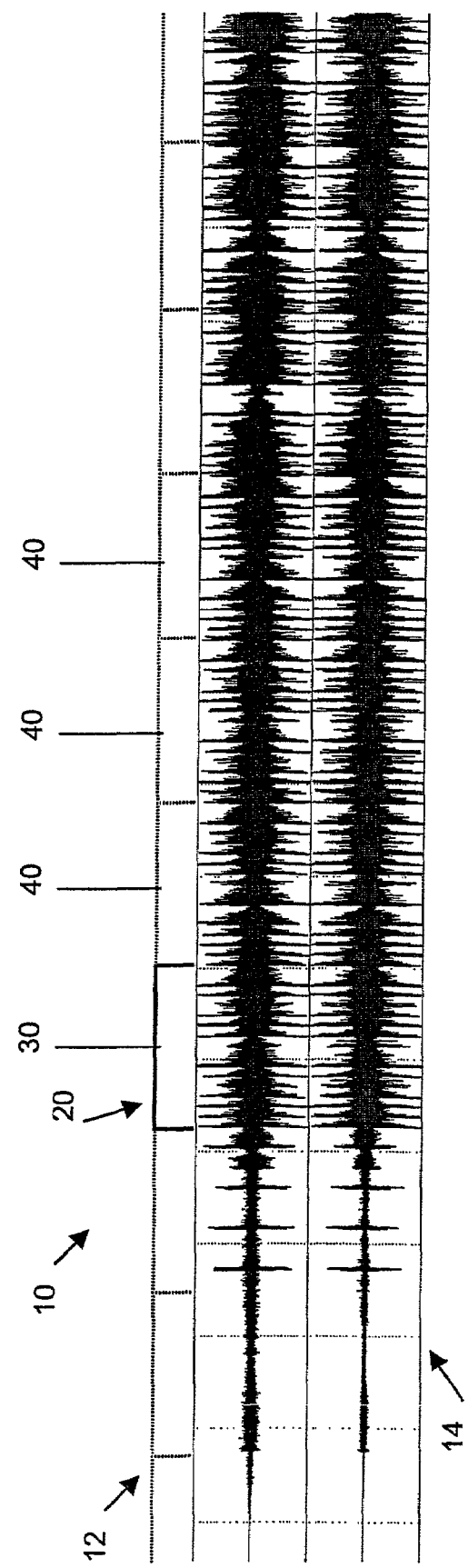
FIG. 4 is a graphical representation of an approximation of periods in the recorded two channel audio signal of FIG. 3 extrapolated to show repetition throughout the recorded signal in accordance with an exemplary embodiment.

FIG. 4 illustrates periods 40 in audio signal 10 extrapolated from period 30. In an exemplary embodiment, periods 40 are approximated automatically from the duration of period 30. That is, periods 40 are assumed to have the same duration as period 30 and begin from the ending point of period 30 (repeating point 32 described with reference to FIG. 3). Periods 40 demonstrate repetition throughout audio signal 10.

Figure 5:
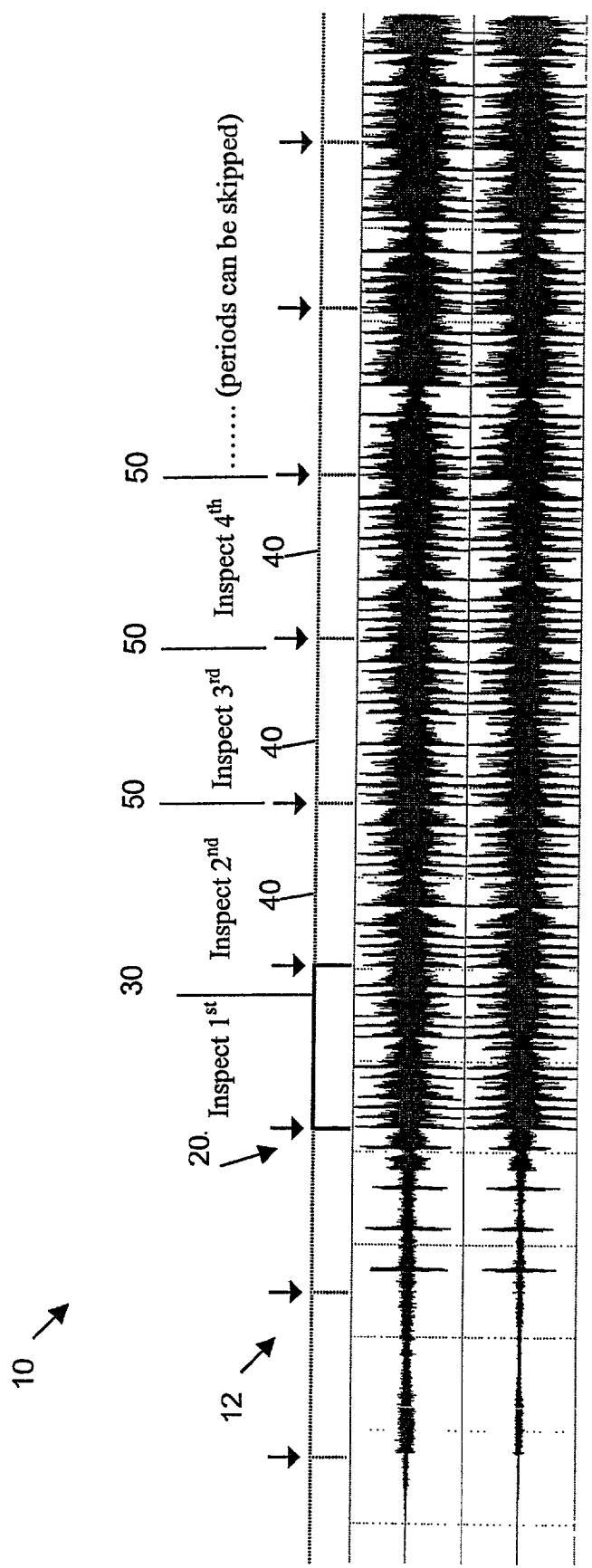
FIG. 5 is a graphical representation of repeat points in the recorded two channel audio signal of FIG. 4 to be inspected and verified in accordance with an exemplary embodiment.

FIG. 5 illustrates inspection points 50 in audio signal 10. In an exemplary embodiment, inspection points 50 are beginning points of periods 40 in audio signal 10 where recurring events are checked to determine the accuracy of periods 40. If periods 40 are accurate, the pattern of recurring events is identical for each of the periods. By sequentially or semi-sequentially reviewing audio signal 10 at inspection points 50, it is possible to determine a more exact period if periods 40 are not exact. For example, if periods 40 are not correct, a different time period is established. The process of identifying a more exact period can continue over several iterations.

In an exemplary embodiment, periods 40 are verified with inspection points 50 using digital signal processing techniques. In one such digital signal processing technique, a computer program is used to identify whether the portions of audio signal 10 included in periods 40 are the same. Evidence of similarity of portions of audio signal 10 can include a digital comparison of audio signal 10 starting from one inspection point 50 and ending at the next inspection point 50 with portions of audio signal 10 between other inspection points 50. A wide variety of digital signal processing techniques may be employed to make such a determination in an accurate and efficient manner. In another embodiment, a computer program makes an analog comparison of portions of audio signal 10 for other periods 40. A wide variety of analog signal processing techniques may be employed to make such a determination in an accurate and efficient manner.

Alternatively, periods 40 can be verified using human interaction. For example, a person can visually inspect portions of audio signal 10 between inspection points 50 and ascertain whether a pattern appears to repeat. If the pattern is not exactly matched by periods 40, the person can adjust the period length using a computer input device, such as, a computer mouse, touch pad, or any mechanism which can provide an indication of tempo changes. In an exemplary embodiment, the person can select one of periods 40 by clicking the computer cursor over the period and then drag the graphical representation of the period to a desired location and length on the graphical representation of audio signal 10. The person can adjust the period size either by increasing the period length, changing the period starting position, decreasing the period length, or changing the period ending point.

Figure 6:
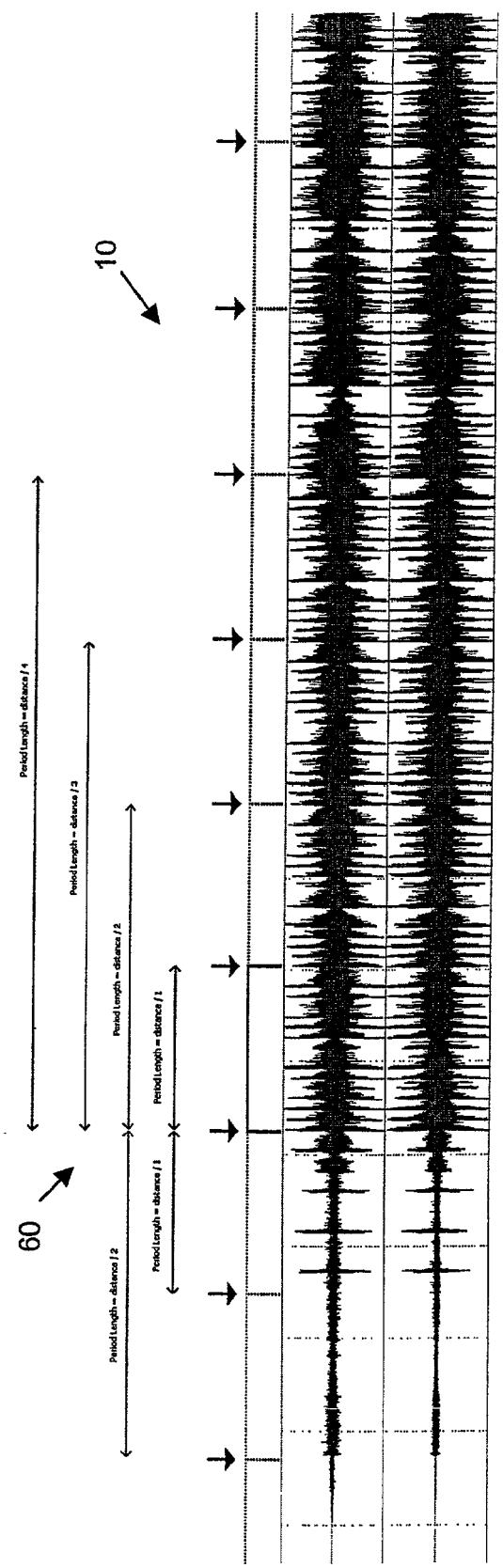
FIG. 6 is a graphical representation of repeat points in the recorded two channel audio signal of FIG. 4 in which the period length is adjusted to various points from the anchor point in accordance with an exemplary embodiment.

FIG. 6 illustrates measurement lengths 60. In an exemplary embodiment, the further from anchor point 20, the more precise the measurement of the period becomes. The further along audio signal 10 from anchor point 20, the greater the differences are in periods, if the period is not exact. For example, if a period is estimated to be t2–t1 and it is off by a time period t=error, then for each subsequent period, the error in the period increases by the number of periods from anchor point 20. For example, where an error of 2 milliseconds is present, the third period will be 6 milliseconds off, the n-th period will be n*2 milliseconds off, and so forth. Accordingly, small errors in the period can be more easily detected by using a longer measurement length.

Figure 7:
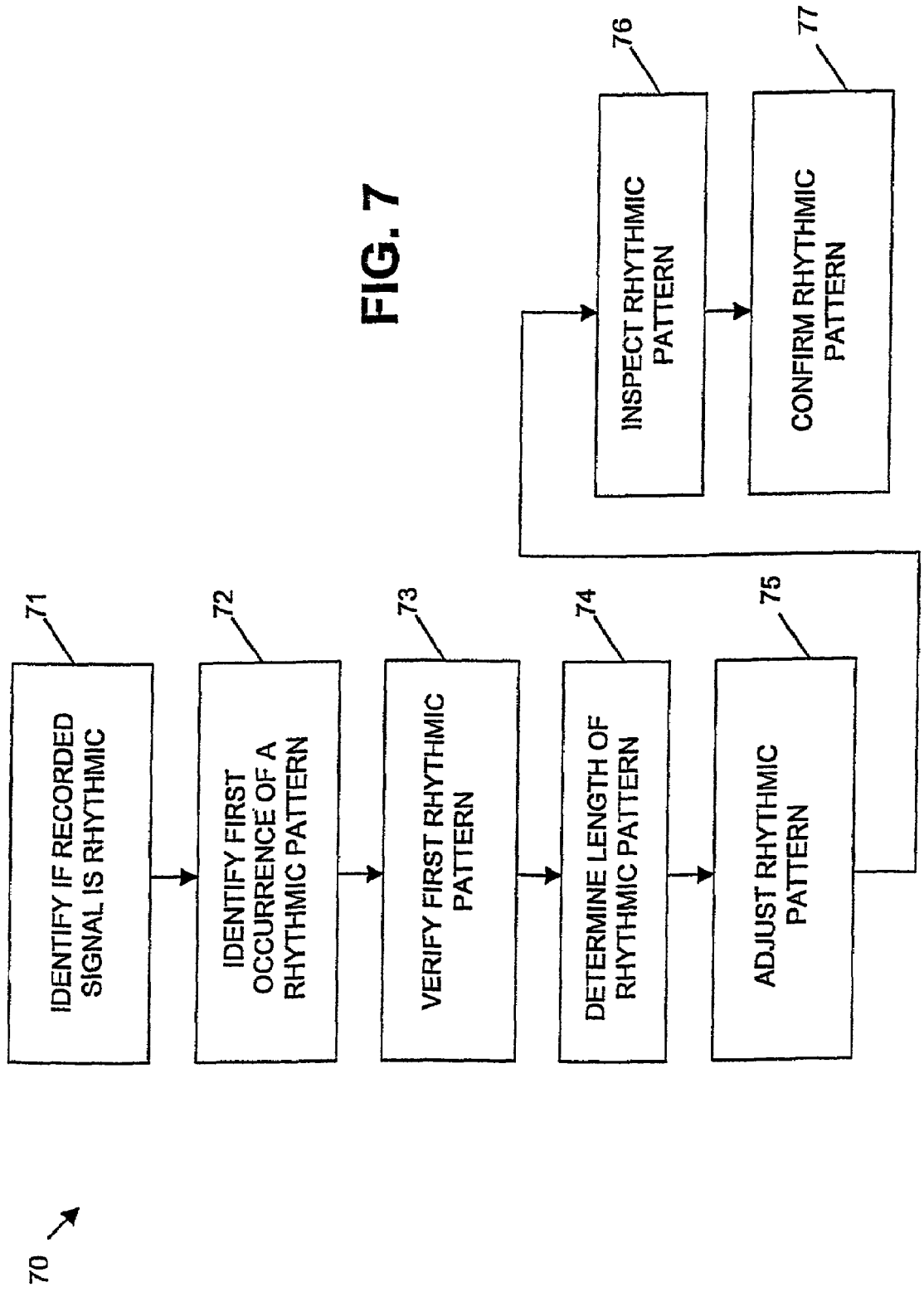
FIG. 7 is a flow diagram of exemplary steps in a process of determining a period of recurring events within a recorded signal in accordance with an exemplary embodiment.

FIG. 7 illustrates a flow diagram 70 depicting exemplary steps in a process of determining a period of recurring events within a recorded signal. In a step 71, an identification procedure can be performed to determine whether a recorded signal is rhythmic. A rhythmic signal is one having patterned or recurring alternations of contrasting elements of sound or speech. Such signals have a regularity which can be measured.

In an exemplary embodiment, a file is provided with a recorded signal. A computer program can be used to ascertain whether tempo information is provided with the recorded signal. For example, tempo information may be stored along with the recorded signal information. If no tempo or rhythmic information is available, a determination must be made as to whether the recorded signal is rhythmic or a rhythm or tempo can be derived from the recorded signal. In an exemplary embodiment, digital signal processing techniques are used to ascertain whether patterns exist in the recorded signal. In an alternative embodiment, a person can indicate that the recorded signal does include rhythms. Such an indication can be provided using a graphical user interface such as the one described below with reference to the screen display illustrated in FIG. 8.

After step 71, a step 72 is performed in which a first occurrence of a rhythmic pattern can be identified. Such an occurrence can be identified using pattern matching digital signal processing techniques and slope detection digital signal processing. An example of such digital signal processing techniques can be found in the software product ACID 3.0 developed and marketed by Sonic Foundry, Inc., of Madison, Wis., and available on the Internet at the http://www.sonicfoundry.com. In an exemplary embodiment, a first occurrence of a rhythmic pattern can be identified using an anchor point, inspection points, and other features as described with reference to FIGS. 1-6.

After step 72, a step 73 is performed in which the first rhythmic pattern identified in step 72 can be verified. In an exemplary embodiment, the rhythmic pattern is verified with user interaction. As described with respect to FIGS. 1-6, a person can selectively chose points on the recorded signal where an anchor point or pattern beginning appears to start. A pattern beginning can correspond to a downbeat in a musical selection. The user can verify the selected anchor point or downbeat visually using a graphical user interface such as the one described with reference to the screen display of FIG. 10.

After step 73, a step 74 is performed in which the length of the rhythmic pattern can be determined. In an exemplary embodiment, pattern matching digital signal processing can be used to determine the length of the rhythmic pattern. The length of the rhythmic pattern can be modified by a person visually verifying rhythmic pattern selections. Such verification can be done by a person using a graphical user interface such as the one described with reference to the screen display of FIG. 11.

After step 74, a step 75 is performed in which the rhythmic pattern can be adjusted to achieve a more precise measurement of the repeat period. In an exemplary embodiment, digital signal processing can be used to adjust the rhythmic patterns or periods to obtain a more exact period measurement. Exemplary techniques to obtaining a more precise measurement of the period are described with reference to FIGS. 1-6.

After step 75, a step 76 is performed in which the rhythmic pattern can be inspected for verification. In an exemplary embodiment, a person can verify the rhythmic patterns by inspecting each repeat of the rhythmic pattern and adjusting the pattern for any variations. As described with reference to FIGS. 1-6, the greater the number of measures or pattern periods inspected, the more precise the pattern can be. Any of a variety of techniques can be employed to verify patterns. Exemplary techniques are described with reference to FIGS. 16. Further, exemplary graphical user interfaces used to verify rhythmic patterns are described below with reference to FIGS. 13-16.

After step 76, a step 77 is performed in which the rhythmic pattern can be confirmed and information regarding the pattern can be associated with the recorded signal. In an exemplary embodiment, information regarding the tempo or period pattern can be saved to a file associated with the file containing the recorded signal or, alternatively, saved to the same file as the file containing the recorded signal. Further, in another exemplary embodiment, it is possible to change the tempo of a pending audio project to match the identified tempo of the recorded signal. In such an embodiment, the pitch of the music or signal whose tempo is changed can be preserved as well. A variety of other features can be utilized once a rhythmic pattern is identified for the recorded signals. Some such features are included in the software product ACID 3.0 developed and marketed by Sonic Foundry, Inc., of Madison, Wis.

FIGS. 8-17 illustrate a variety of screen displays including graphical user interfaces (GUIs) which can be utilized in an exemplary system or method. As this disclosure provides exemplary embodiments, other interfaces can be utilized for a variety of different platforms. For example, different interfaces can be used with wireless application protocol (WAP) devices, personal digital assistants (PDAs), or any device which can be configured to perform the exemplary functions described herein.

Figure 8:
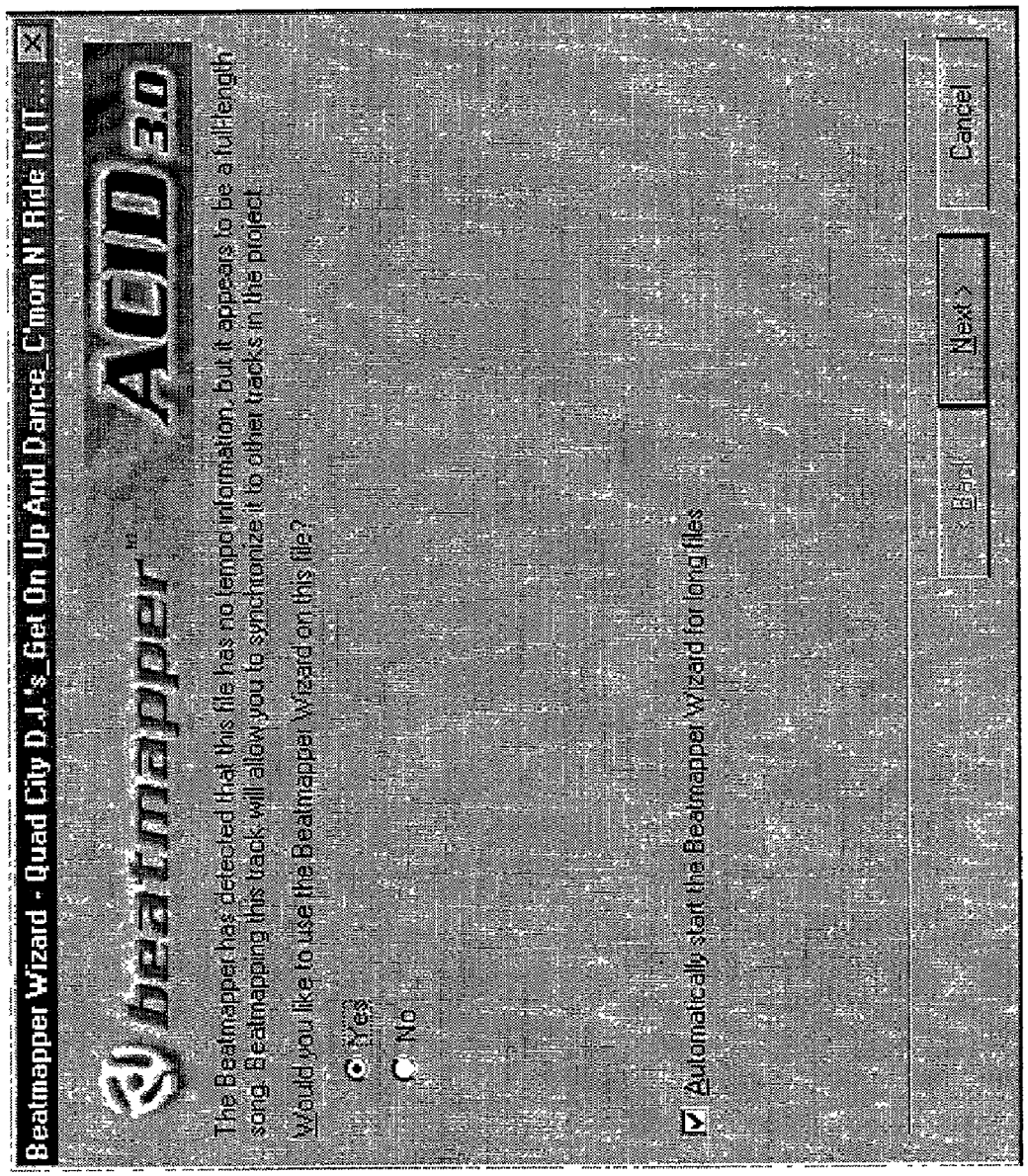
FIG. 8 is a display screen identifying that a file containing a recorded signal does not include tempo information in accordance with an exemplary embodiment.
Figure 9:
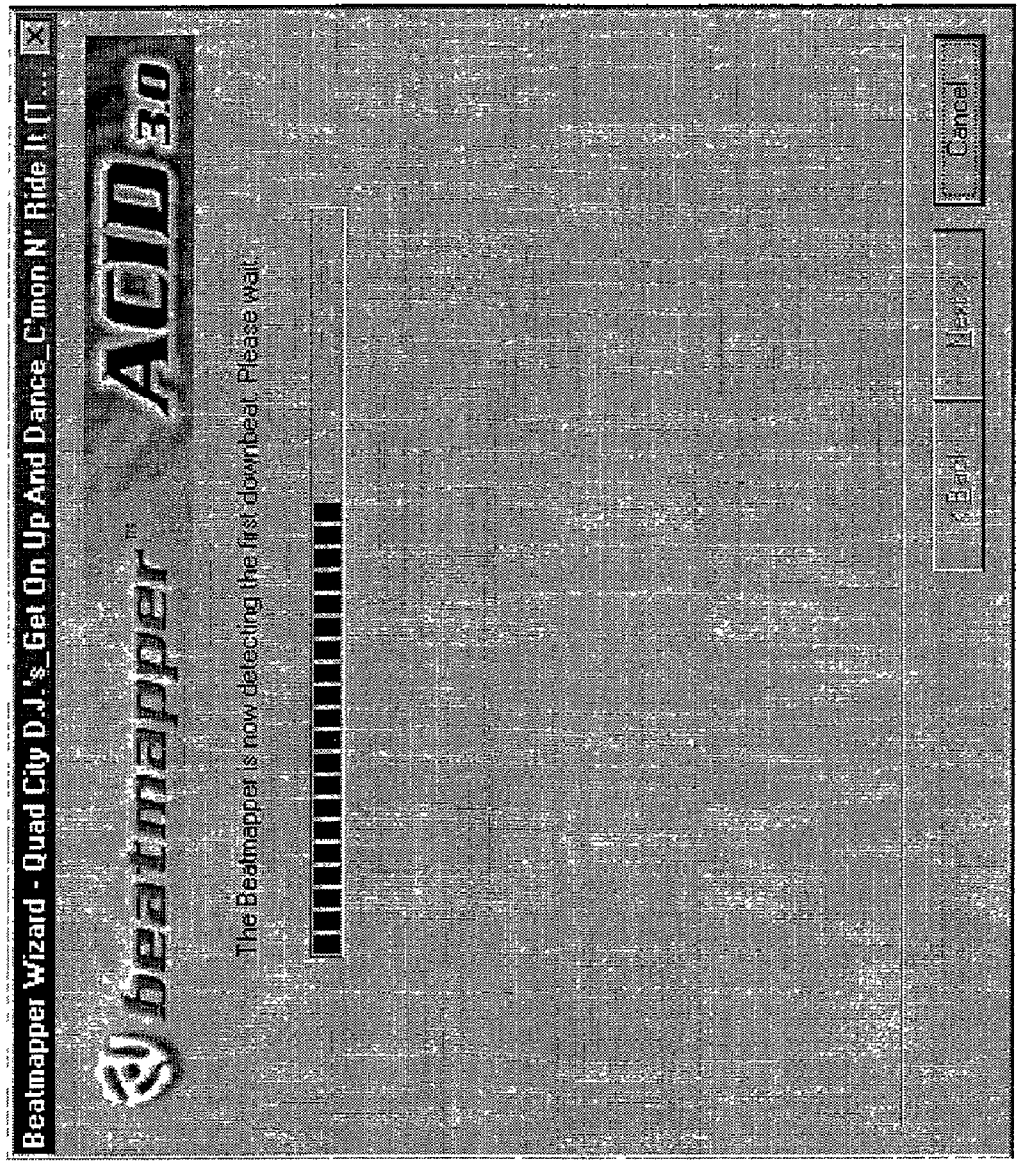
FIG. 9 is a display screen notifying a user of processing attempts to identify a first occurrence of a rhythmic pattern.
Figure 10:
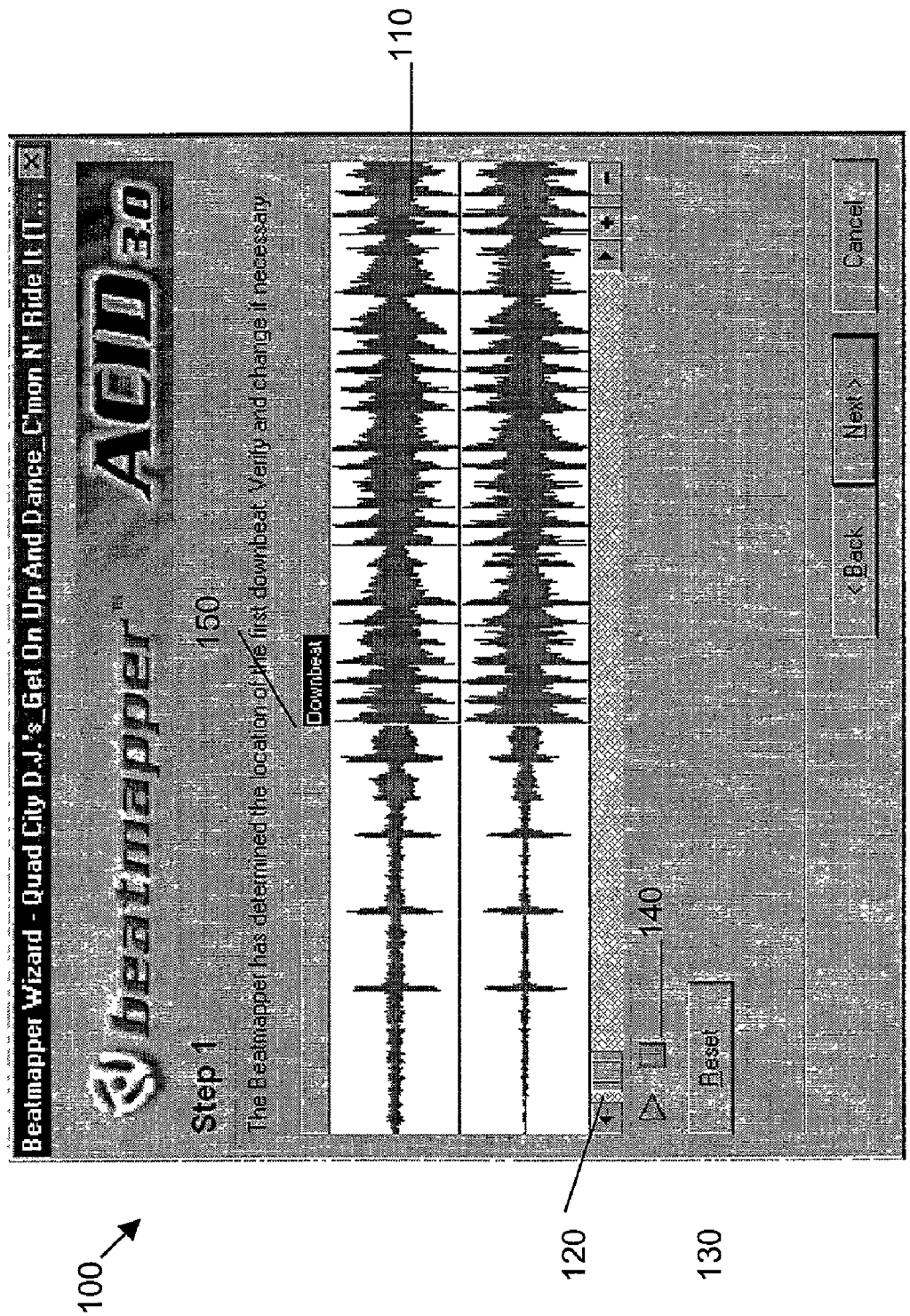
FIG. 10 is a display screen displaying an identified first rhythmic pattern and requesting verification.

Referring now to FIG. 8, a display screen 80 can identify that a file containing a recorded signal does not include tempo information. FIG. 9 illustrates a display screen 90 notifying a user of processing attempts to identify a first occurrence of a rhythmic pattern. FIG. 10 illustrates a display screen 100 showing an identified first rhythmic pattern and requesting verification from the user. Display screen 100 can include a signal display area 110, a scroll bar 120, a play button 130, a stop button 140, and a downbeat indicator 150. Signal display area 110 provides a graphical representation of the recorded signal. Scroll bar 120 provides the capability of scrolling throughout portions of the recorded signal as displayed in signal display area 110. Play button 130 allows the user to play the recorded signal. In an exemplary embodiment, the recorded signal can be played at any location in the signal, as selected by, for example, a mouse click by the user or other such input from a mechanism which can provide an indication of tempo changes. Stop button 140 allows the user to stop the recorded signal at any time or any location in the signal. Downbeat indicator 150 provides an indication as to the location of an anchor point or a downbeat which can be used in the identification of periods of recurring events. Such periods of recurring events can be called measures or loops.

Figure 11:
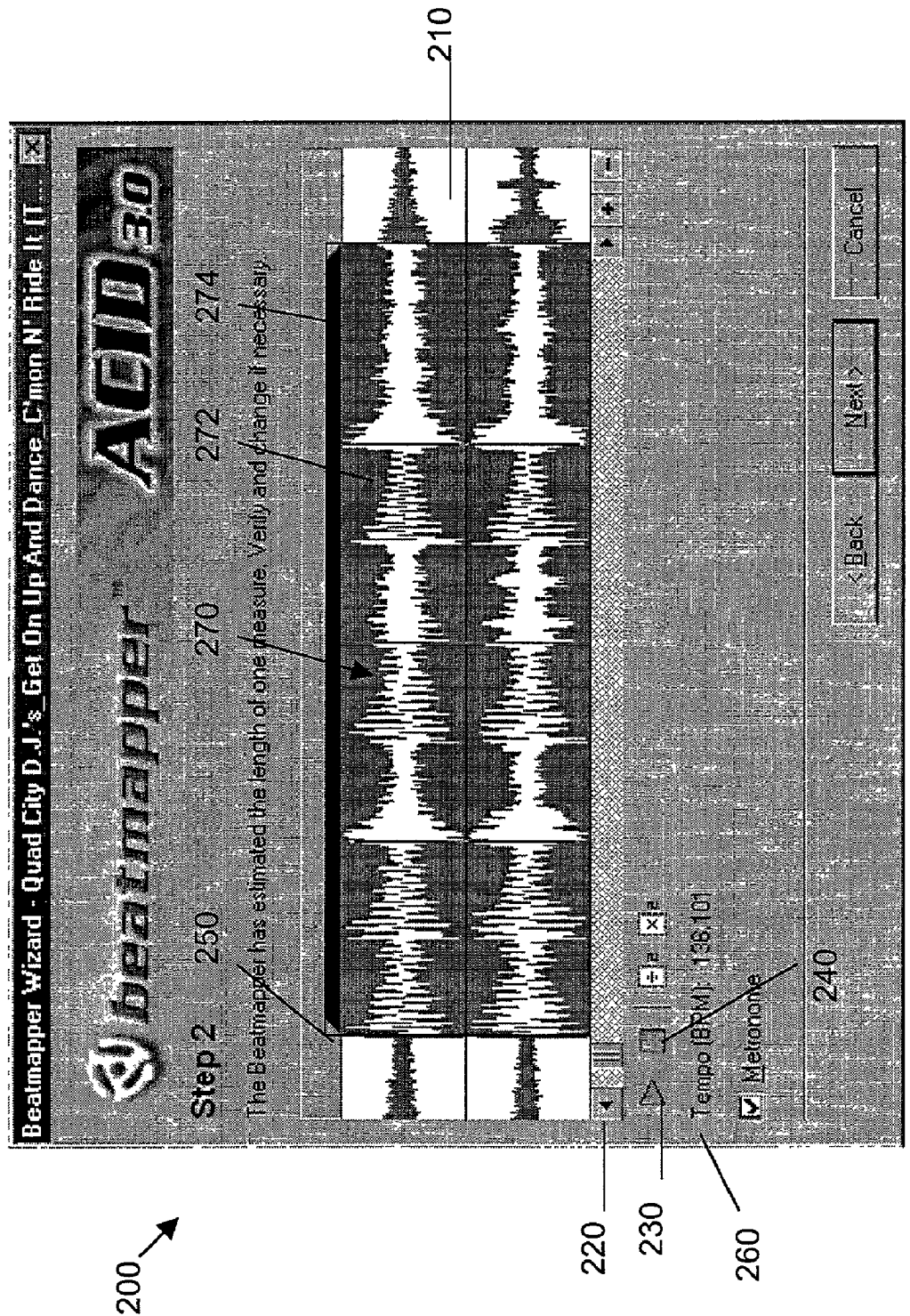
FIG. 11 is a display screen displaying an estimate of the length of a rhythmic pattern.

FIG. 11 illustrates a display screen 200. In an exemplary embodiment, display screen 200 can include a signal display area 210, a scroll bar 220, a play button 230, a stop button 240, a downbeat indicator 250, a tempo indicator 260, and an estimated measure area 270. Signal display area 210, scroll bar 220, play button 230, stop button 240, and downbeat indicator 250 are similar in functionality to signal display area 110, scroll bar 120, play button 130, stop button 140, and downbeat indicator 150 described with reference to FIG. 10. Tempo indicator 260 provides an indication of the beats per minute (BPM) or the tempo at which the signal is played when play button 230 is selected. Estimated measure area 270 provides a graphical indication on signal display area 210 of the estimated length of one period, measure, or loop. In an exemplary embodiment, estimated measure area 270 includes a shaded graphical area 272 and a graphical bar 274 extending the length of the measure.

Figure 12:
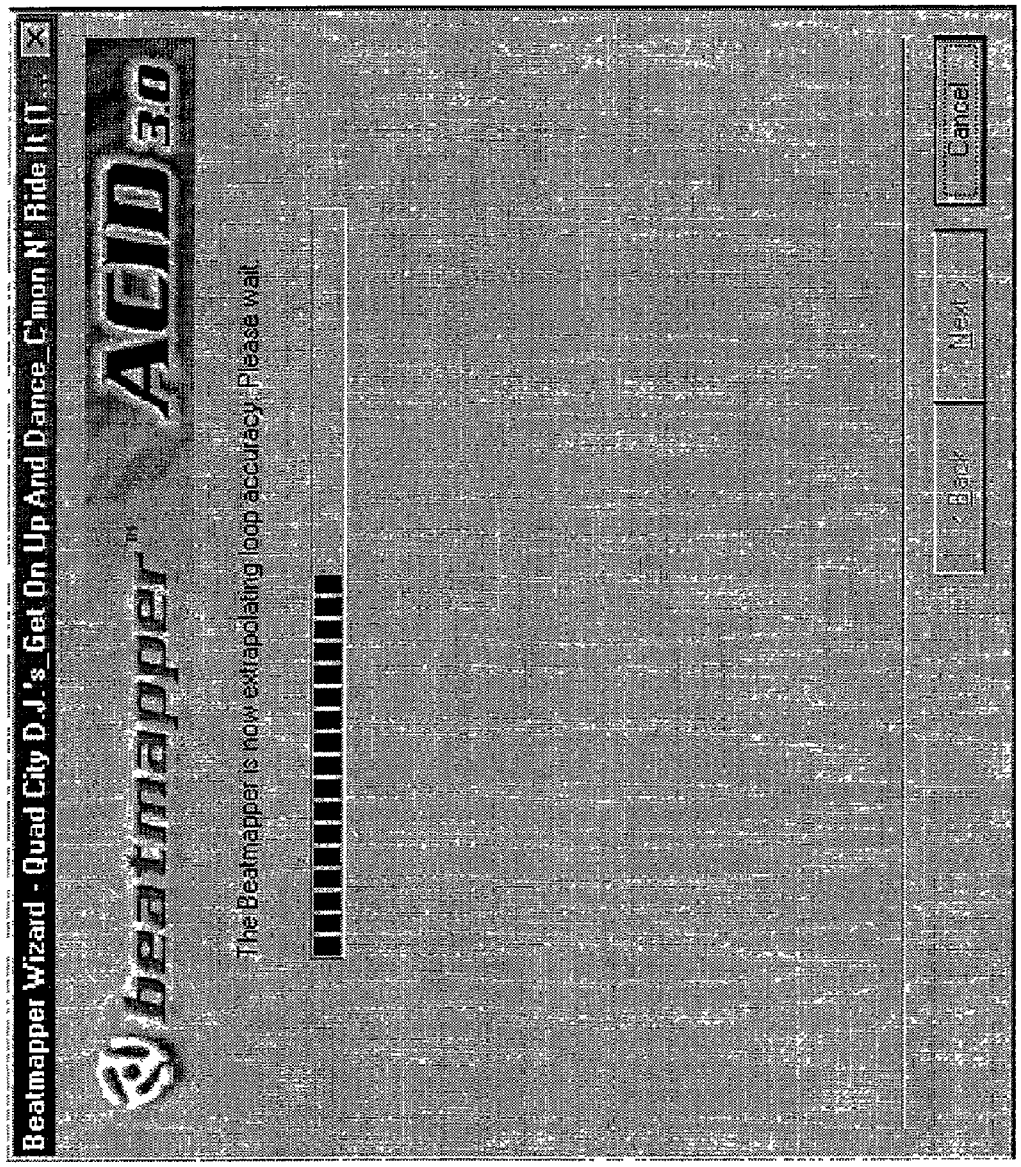
FIG. 12 is a display screen displaying notification of efforts to gain a precise measurement of the repeat period in accordance with an exemplary embodiment.
Figure 13:
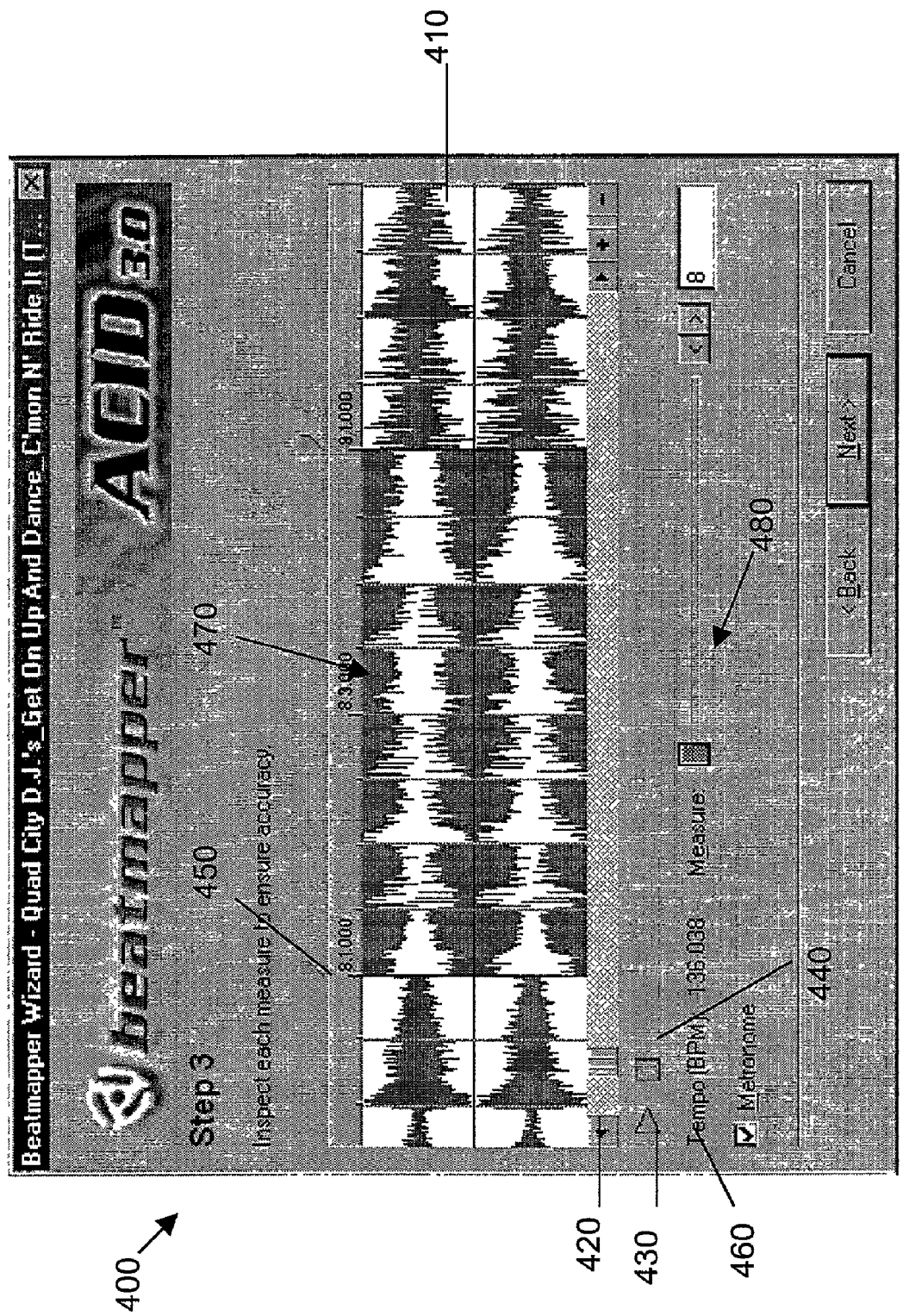
FIG. 13 is a display screen displaying a two channel recorded audio signal and a repeated rhythmic pattern in the signal.

FIG. 12 illustrates a display screen 300 notifying the user of efforts to gain a precise measurement of the repeat period. FIG. 13 illustrates a display screen 400. In an exemplary embodiment, display screen 400 can include a signal display area 410, a scroll bar 420, a play button 430, a stop button 440, a downbeat indicator 450, a tempo indicator 460, an estimated measure area 470, and a measure number selector 480. Signal display area 410, scroll bar 420, play button 430, stop button 440, downbeat indicator 450, tempo indicator 460, and estimated measure area 470 are similar in functionality to signal display area 210, scroll bar 220, play button 230, stop button 240, downbeat indicator 250, tempo indicator 260, and estimated measure area 270 described with reference to FIG. 11. Measure number selector 480 can include a slide bar, up and down arrows, and a text box which can be used to select specific measures or periods within the recorded signal displayed in signal display area 410.

Figure 14:
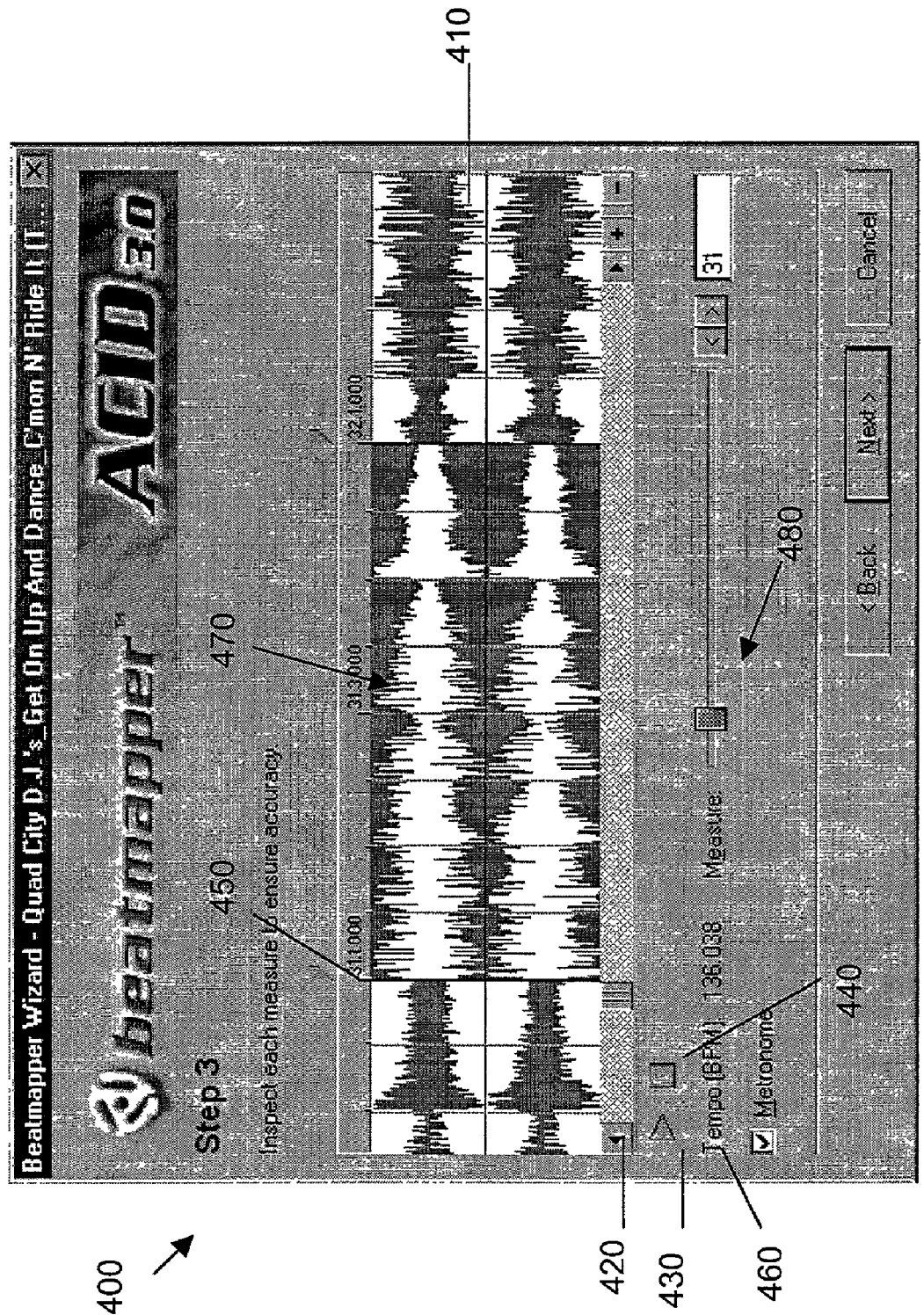
FIG. 14 is display screen of the two channel recorded audio signal of FIG. 13, illustrating an animation feature in which repetitions or measures of the recorded signal are animated in accordance with an exemplary embodiment.

FIG. 14 illustrates an animation feature of screen display 400. In an exemplary embodiment, the two channel recorded audio signal and a repeated rhythmic pattern in the signal can be visualized using an animation feature. The animation feature is achieved by moving scroll bar 420. Repetitions or measures in the recorded signal can be visualized as they move in signal display area 410 according to movement of scroll bar 420. Lack of precision in the period selection can be seen if the signal seems to move about with respect to the chosen periods. A more precise period can be seen to have nodes at the beginning and end of the period where no movement is witnessed (i.e., the amplitude of the signal at the beginning and end of the period is constant) as scroll bar 420 is moved over various periods.

Figure 15:
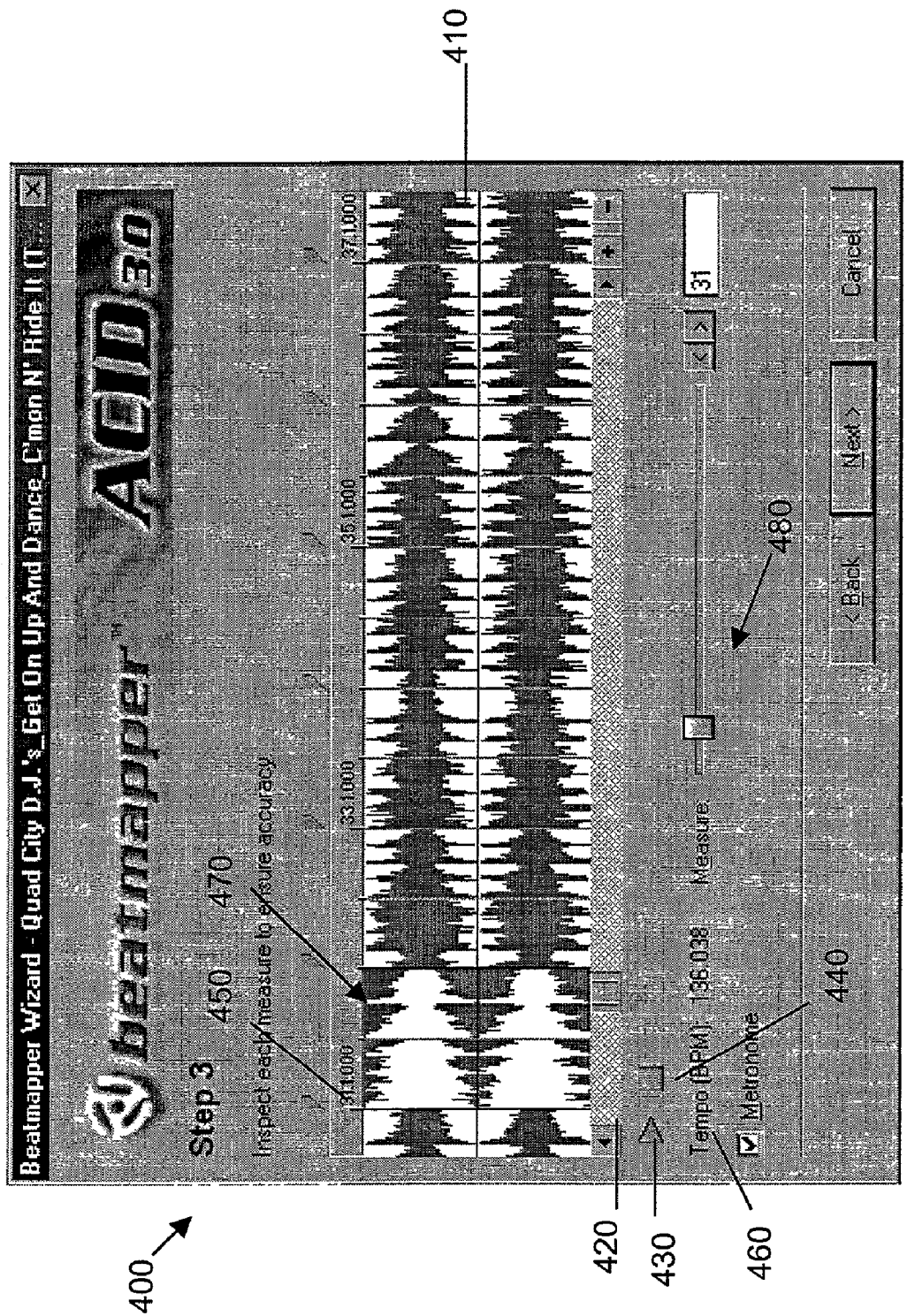
FIG. 15 is a display screen of the two channel recorded audio signal of FIG. 13, illustrating a zoom feature in which multiple measures or repetitions or measures of the recorded signal are shown.
Figure 16:
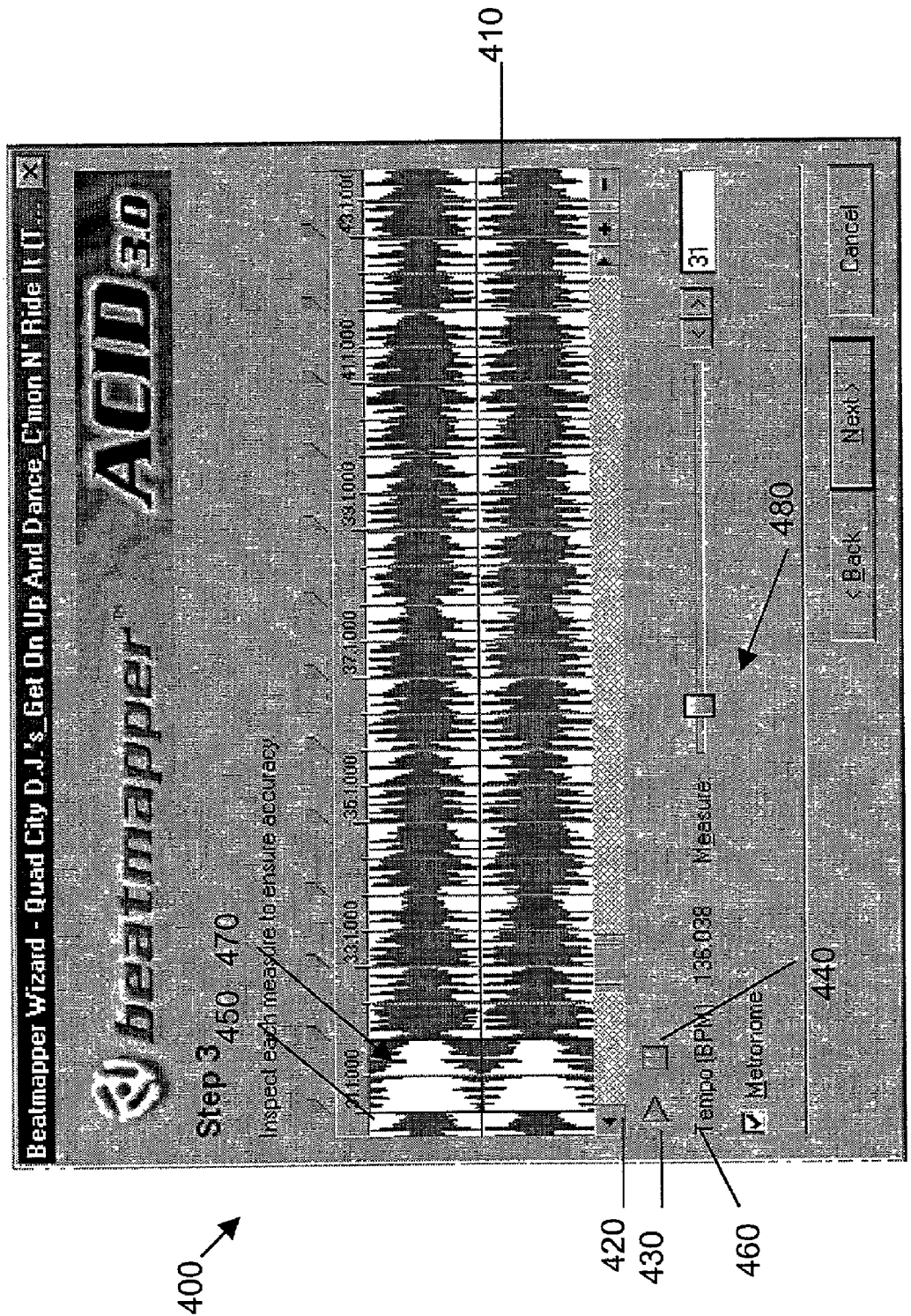
FIG. 16 is a display screen of the two channel recorded audio signal of FIG. 13, illustrating a zoom feature in which multiple measures or repetitions or measures of the recorded signal are shown.

FIGS. 15 and 16 illustrate screen display 400. In an exemplary embodiment, signal display area 410 can be zoomed in or out to show a varying number of repetitive periods or measures in the recorded signal. Zooming is another feature that can be used to assist in determining the accuracy of the period duration selected. The accuracy of the period can be seen from the presence of constant nodes at the beginning and end of periods.

Figure 17:
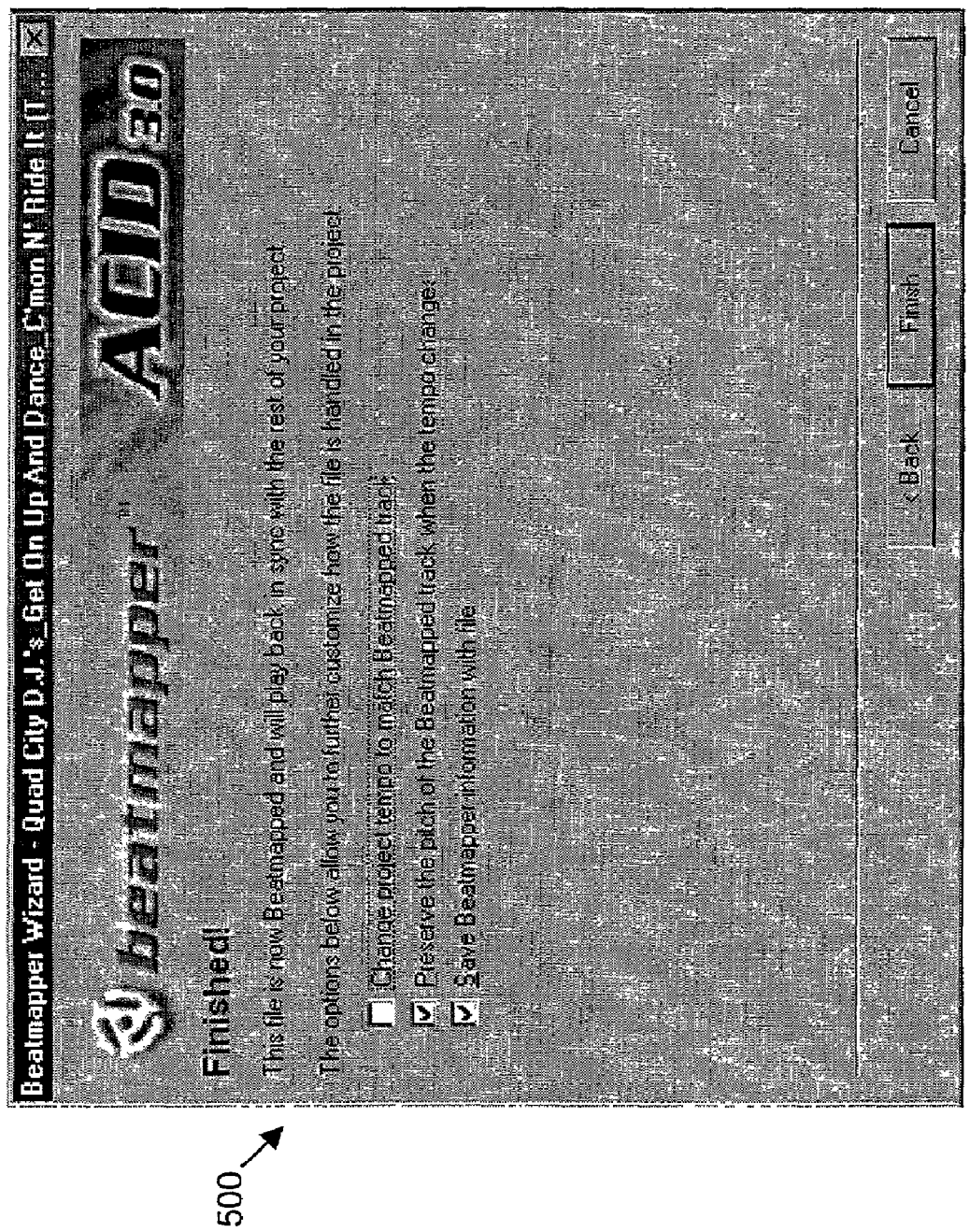
FIG. 17 is a display screen notifying the user that recurring event information has been identified for the given file.

FIG. 17 illustrates a display screen 500. In an exemplary embodiment, the user is notified that recurring event information has been identified for the given recorded signal file. The user can be provided options to customize how the recorded signal file is handled. For example, the tempo of a pending project with which the recorded signal will be combined can be changed to match the identified tempo of the recorded signal. Another example of an available feature is preserving the pitch of the recorded signal despite tempo changes.

Advantageously, the system and method described with reference to the FIGURES provides for a variety of applications. For example, the system and method provides for an improved ability to transition from one recorded signal to another recorded signal. As such, a smooth transition from one song having a first tempo to a second song having a different tempo can be automated. In many instances, such a feature helps a disc jockey transition to and from a variety of music. In another application, video clips can be automatically edited such that transitions between different clips occur at the proper location. As such, the time necessary to do video editing is dramatically decreased. Furthermore, separate audio, video, and other media files can be automatically combined and be synchronized.

While the embodiments illustrated in the FIGURES and described above are presently preferred, it should be understood that these embodiments are offered by way of example only. Other embodiments may include additional procedures or steps not described here. The invention is not limited to a particular embodiment, but extends to various modifications, combinations, and permutations that nevertheless fall within the scope and spirit of the appended claims.

What is claimed is:

1. A method, comprising:
   determining a period of recurring events within a recorded signal, the period of recurring events providing a measurement of a tempo of the recorded signal, said determining comprising:
      establishing an anchor point in the recorded signal, the anchor point being indicative of a beginning point for a period of recurring events in the recorded signal;
      determining a length for the period of recurring events in the recorded signal by digitally comparing a first portion of the recorded signal starting from the established anchor point with at least one different portion of the recorded signal subsequent to the anchor point, said at least one different portion extrapolated from the first portion; and
      refining the length for the period of recurring events by digitally comparing a pattern included by the first portion with patterns included by said at least one different portion subsequent to the anchor point, each subsequent portion having the length of the first portion;

associating the tempo with the recorded signal; and
using the tempo to process the recorded signal with a second recorded signal.

2. The method of claim 1, further comprising determining if the recorded signal is rhythmic.

3. The method of claim 1, wherein establishing an anchor point in the recorded signal comprises
   utilizing digital signal processing techniques, including pattern matching and slope detection techniques, to identify where recurring events begin.

4. The method of claim 1, wherein establishing an anchor point in the recorded signal comprises
   receiving an indication of a location on the recorded signal from a computer input device.

5. The method of claim 1, wherein determining a length for the period of recurring events in the recorded signal comprises
   utilizing digital signal processing techniques.

6. The method of claim 1, wherein determining a length for the period of recurring events in the recorded signal comprises receiving an indication of a length of the period on the recorded signal from a computer input device.

7. The method of claim 1, wherein refining the length for the period of recurring events comprises
   utilizing digital signal processing techniques.

8. The method of claim 1, wherein refining the length for the period of recurring events comprises using the distance between multiple anchor points as a guide to estimate an approximate count of time periods from which a tempo can be derived.

9. In a computer system comprising:
   means for establishing an anchor point in a recorded signal, the anchor point being indicative of a beginning point for a period of recurring events in the recorded signal;
   means for determining a length for the period of recurring events in the recorded signal, the length determined by digital comparison of a portion of the recorded signal starting from the established anchor point with at least one different portion of the recorded signal subsequent to the anchor point, said at least one different portion extrapolated from the first portion;
   means for refining the length for the period of recurring events by digitally comparing a pattern included by the first portion with patterns included by said at least one different portion subsequent to the anchor point, each subsequent portion having the length of the first portion;
   wherein the period of recurring events provides a measurement of a tempo of the recorded signal;
   means for associating the tempo with the recorded signal; and
   means for using the tempo to process the recorded signal with a second recorded signal.

10. The system of claim 9, further comprising means for adjusting the length for the period of recurring events.

11. The system of claim 9, wherein the means of establishing the anchor point in the recorded signal comprises means for identifying where recurring events begin.

12. The system of claim 9, wherein the means of establishing the anchor point in the recorded signal comprises means for receiving an indication of a location on the recorded signal from a computer input device.

13. The system of claim 9, further comprising means for combining said recorded signal having said tempo with another recorded signal of an unknown tempo.

14. The system of claim 9, further comprising
means for presenting the recorded signal and portions in the recorded signal, including a graphical user interface.

15. A processing system comprising:
a central processing unit; and
a storage device coupled to said central processing unit and having stored there information for configuring the central processing unit to determine a period of recurring events in a recorded signal, the period of recurring events providing a measurement of a tempo of the recorded signal, wherein the determining comprises:
establishing a loop starting point in the recorded signal, the loop starting point being indicative of a beginning point for a period of recurring events in the recorded signal, the period of recurring events defining a loop;
determining a length for the loop in the recorded signal by digitally comparing a first loop of the recorded signal starting from the established loop starting point with at least one different loop of the recorded signal subsequent to the loop starting point, said at least one different loop extrapolated from the first loop;
adjusting the length of the loop by digitally comparing a pattern included by the first loop with patterns included by said at least one different loop subsequent to the loop starting point, each subsequent loop being defined as a portion of the recorded signal having the length of the first loop and starting at a point in the recorded signal later in time;
associate the tempo with the recorded signal; and
use the tern o to process the recorded signal with a second recorded signal.

16. The system of claim 15, further comprising
a presentation device, wherein the presentation device is configured to provide a graphical user interface which presents portions of the recorded signal.

17. The system of claim 15, further comprising
an interface device configured to connect the central processing unit with a network of computers.

18. A method comprising the acts of:
displaying a graphical representation of a recorded audio signal;
establishing an anchor point in the audio signal, wherein the anchor point identifies where a rhythmic pattern in the audio signal appears to begin;
identifying a first period during which the rhythmic pattern in the audio signal appears to occur, the first period beginning at the anchor point and ending at a repeating point;
identifying a second period during which the rhythmic pattern in the audio signal appears to occur, the second period beginning at the repeating point,
wherein identifying the second period includes a digital comparison of a portion of the audio signal from the first period with a portion of the audio signal starting at the repeating point;
adjusting the rhythmic pattern such that a duration of the first period is substantially the same as a duration of the second period, the durations establishing tempo information for the audio signal;
associating the tempo information with the recorded audio signal; and
using the tempo information to process the recorded audio signal with a second recorded audio signal.

* * * * *